United States Patent
Wong

(10) Patent No.: US 10,638,002 B2
(45) Date of Patent: Apr. 28, 2020

(54) SYSTEM AND METHOD FOR AUTOMATED PRINTING OF NETWORK DOCUMENTS

(71) Applicants: Toshiba TEC Kabushiki Kaisha, Shinagawa-ku (JP); Kabushiki Kaisha Toshiba, Minato-ku (JP)

(72) Inventor: Jeffrey Wong, Aliso Viejo, CA (US)

(73) Assignees: Toshiba TEC Kabushiki Kaisha, Shinagawa-ku (JP); Kabushiki Kaisha Toshiba, Minato-ku (JP)

(*) Notice: Subject to any disclaimer, the term of this patent is extended or adjusted under 35 U.S.C. 154(b) by 0 days.

(21) Appl. No.: 16/521,791

(22) Filed: Jul. 25, 2019

(65) Prior Publication Data

US 2019/0349487 A1 Nov. 14, 2019

Related U.S. Application Data

(63) Continuation of application No. 15/712,457, filed on Sep. 22, 2017, now abandoned.

(51) Int. Cl.
| | |
|---|---|
| H04L 29/08 | (2006.01) |
| H04N 1/00 | (2006.01) |
| H04N 1/04 | (2006.01) |
| G06F 16/95 | (2019.01) |
| G06F 16/957 | (2019.01) |

(52) U.S. Cl.
CPC ......... *H04N 1/00331* (2013.01); *G06F 16/95* (2019.01); *G06F 16/957* (2019.01); *H04L 67/02* (2013.01); *H04L 67/34* (2013.01); *H04N 1/001* (2013.01); *H04N 1/04* (2013.01)

(58) Field of Classification Search
USPC ............................. 358/1.11–3.29, 1.11–1.18
See application file for complete search history.

(56) References Cited

U.S. PATENT DOCUMENTS

| | | | |
|---|---|---|---|
| 6,928,620 B1* | 8/2005 | Crangle | G06F 3/0486 715/769 |
| 2003/0123079 A1* | 7/2003 | Yamaguchi | G06F 3/1204 358/1.15 |
| 2003/0173409 A1* | 9/2003 | Vogt | G06K 19/04 235/492 |
| 2005/0099650 A1* | 5/2005 | Brown | H04N 1/00209 358/1.15 |
| 2011/0282736 A1* | 11/2011 | Lee | G06Q 30/0238 705/14.49 |
| 2013/0063749 A1* | 3/2013 | Ohisa | H04N 1/00204 358/1.13 |

\* cited by examiner

*Primary Examiner* — Marcellus J Augustin
(74) *Attorney, Agent, or Firm* — Ulmer & Berne LLP

(57) ABSTRACT

A system and method for contemporaneous printing of a document along with content obtained from a network, in accordance with embedded network address information, includes a print engine, a network interface and an intelligent controller. An electronic document is parsed to identify at least one embedded network addresses. Content associated with each embedded network address is obtained from a network and printed contemporaneously with the original document. Separator pages preceding content obtained from the network are generated and include the network address from which content that follows was obtained, along with a page number in the original document where the address appeared.

20 Claims, 4 Drawing Sheets

SYSTEM AND METHOD FOR AUTOMATED PRINTING OF NETWORK DOCUMENTS

REFERENCE TO RELATED APPLICATIONS

This application is a Continuation to U.S. patent application Ser. No. 15/712,457, filed Sep. 22, 2017, the content of which is also incorporated herein by reference.

TECHNICAL FIELD

This application relates generally to printing of electronic documents. The application relates more particularly to automated identification and printing of documents retrieved from network locations referenced in an electronic document during printing of the electronic document.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used.

Digital devices, such as computers, including MFPs, are increasingly networked to share data, documents or resources. The advent and growth of the global Internet provides digital devices with access to a wide array of digital content, including web pages for display on a browser and electronic image files that can be downloaded, displayed and even edited. If a user desires to print network content, they typically navigate to a site, such as via a web browser, a remote login or via a file transfer protocol (FTP). The user then downloads the content and saves it to their local device. Then, they may open an application that corresponds to a file type, such as a word processor, and send the document to a printer for printing.

If a user downloads multiple file types, they may have to use several applications to view and print them. By way of example, a user may download a document in Portable Document Format (PDF), save it to memory, and open it with ADOBE Reader to view and print. They may then download an image file, such as a JPEG, bitmap or GIF file and open it with a program such as PAINT for viewing and printing.

SUMMARY

In accordance with an example embodiment of the subject application, a system and method for contemporaneous printing of a document along with content obtained from a network in accordance with embedded network address information includes a print engine, a network interface and an intelligent controller. An electronic document is parsed to identify at least one embedded network addresses. Content associated with each embedded network address is obtained from a network and printed along with the original document.

BRIEF DESCRIPTION OF THE DRAWINGS

Various embodiments will become better understood with regard to the following description, appended claims and accompanying drawings wherein:

DETAILED DESCRIPTION

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

Many documents today include references to network locations. For example, a document may identify a website that may be relevant to an associated topic, by stating "For more information, please check out www.company.com." A document may also include specific reference to a downloadable document, such by stating, "This document can be found at www.company.com/document.pdf." If a user wishes to have a complete printout of a main document and referenced documents, they would need to print the electronic file, find network links that appear in the document, login with their browser and then download each document to their local drive. Then, for each file, they would open a compatible application for viewing and printing. They would then print each document and assemble them with a printout of the main document.

In accordance with example embodiments herein, a user need only send an electronic file to a suitably enabled printer and documents or web pages referenced in that document would automatically be obtained from a network and printed alongside the base document.

Figure 1:
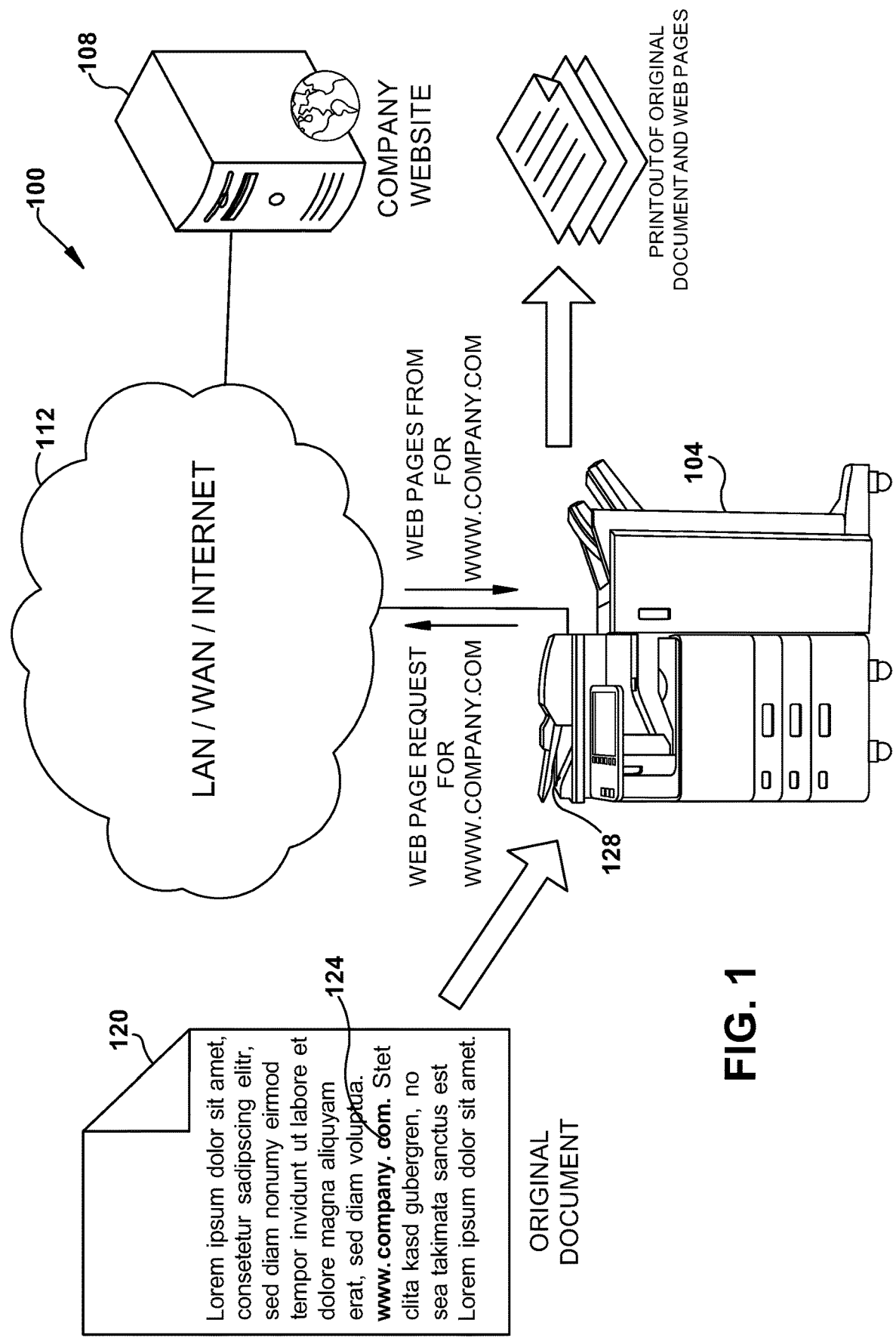
FIG. 1 is an example embodiment of a printing system.

In accordance with the subject application, FIG. 1 illustrates an example embodiment of 100 that includes one or more MFPs, illustrated by MFP 104, which are in data communication with one or more servers, such as server 108, via any suitably data network 112, which may be comprised of a local area network (LAN), a wide area network (WAN) which may comprise the Internet, or any suitable combination thereof. An original document 120 includes one or more embedded network locations, such as a Uniform Resource Locator (URL) 124 for www.company.com as illustrated. Original document 120 is suitably in electronic form, or placed in electronic form by a document scanner 128 of MFP 104. If an original electronic document includes character data, a processor, suitably part of an intelligent controller of MFP 104, suitably parses the document for character strings indicative of a network address. Suitable network locations may be specified by a URL as noted above, or by an Internet Protocol address such as and IP v.4 address such as 111.112.113.114 or an IP v.6 address such as 2001:0db8:0000:0000:0000:ff00:0042:8329.

A URL may point to a web site from which a printout of a page can be made, or to a particular document for retrieval. In the event of a scanned original document, a resultant scan image file is suitably processed via any suitable optical character recognition (OCR) program to extract character information which may include network locations. In the example embodiment of FIG. 1, URL 124 is detected in an character inclusive electronic file, and that address is used to retrieve content from server 108 associated with that address. Content is downloaded from server 108, and associated with an electronic file for document 120. A printing of document 120 is automatically appended with a printout of content obtained from server 108. This is suitably done for any or all identifiable network content resources provided in original document 120.

Figure 2:
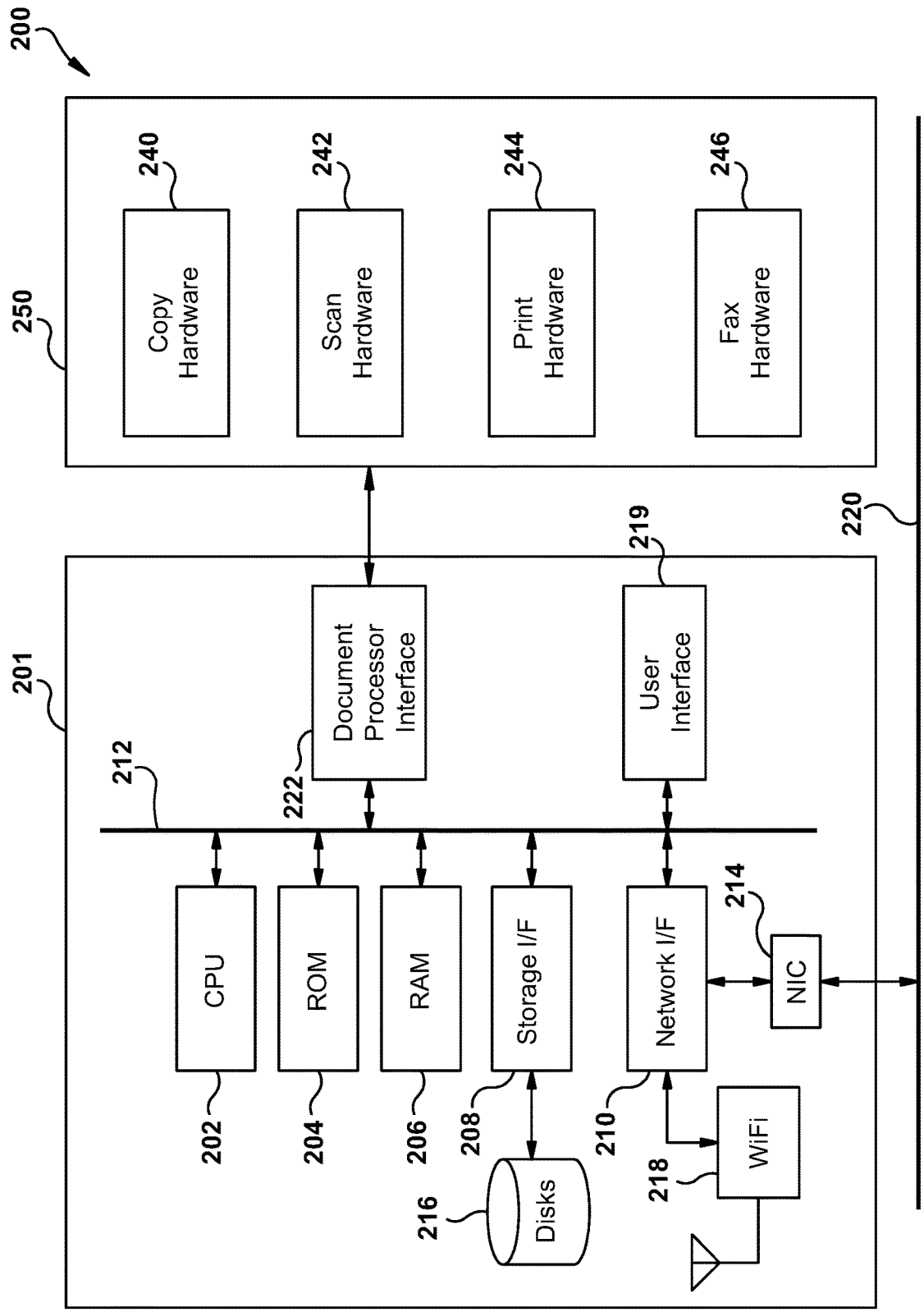
FIG. 2 is an example embodiment of a networked digital device.

Turning now to FIG. 2 illustrated is an example embodiment of a networked digital device comprised of document rendering system 200 suitably comprised within an MFP, such as with MFP 104 of FIG. 1. Included in controller 201 are one or more processors, such as that illustrated by processor 202. Each processor is suitably associated with non-volatile memory, such as ROM 204, and random access memory (RAM) 206, via a data bus 212.

Processor 202 is also in data communication with a storage interface 208 for reading or writing to a storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired or physical network connection 220, or to a wireless data connection via wireless network interface 218. Example wireless connections include cellular, Wi-Fi, Bluetooth, NFC, wireless universal serial bus (wireless USB), satellite, and the like. Example wired interfaces include Ethernet, USB, IEEE 1394 (FireWire), Lightning, telephone line, or the like. Processor 202 is also in data communication with BLUETOOTH Interface 221 which may be programmed to function as a device beacon as noted above.

Processor 202 can also be in data communication with any suitable user input/output (I/O) interface 219 which provides data communication with user peripherals, such as displays, keyboards, mice, track balls, touch screens, or the like.

Also in data communication with data bus 212 is a document processor interface 222 suitable for data communication with MFP functional units 250. In the illustrated example, these units include copy hardware 240, scan hardware 242, print hardware 244 and fax hardware 246 which together comprise MFP functional hardware 250.

Figure 3:
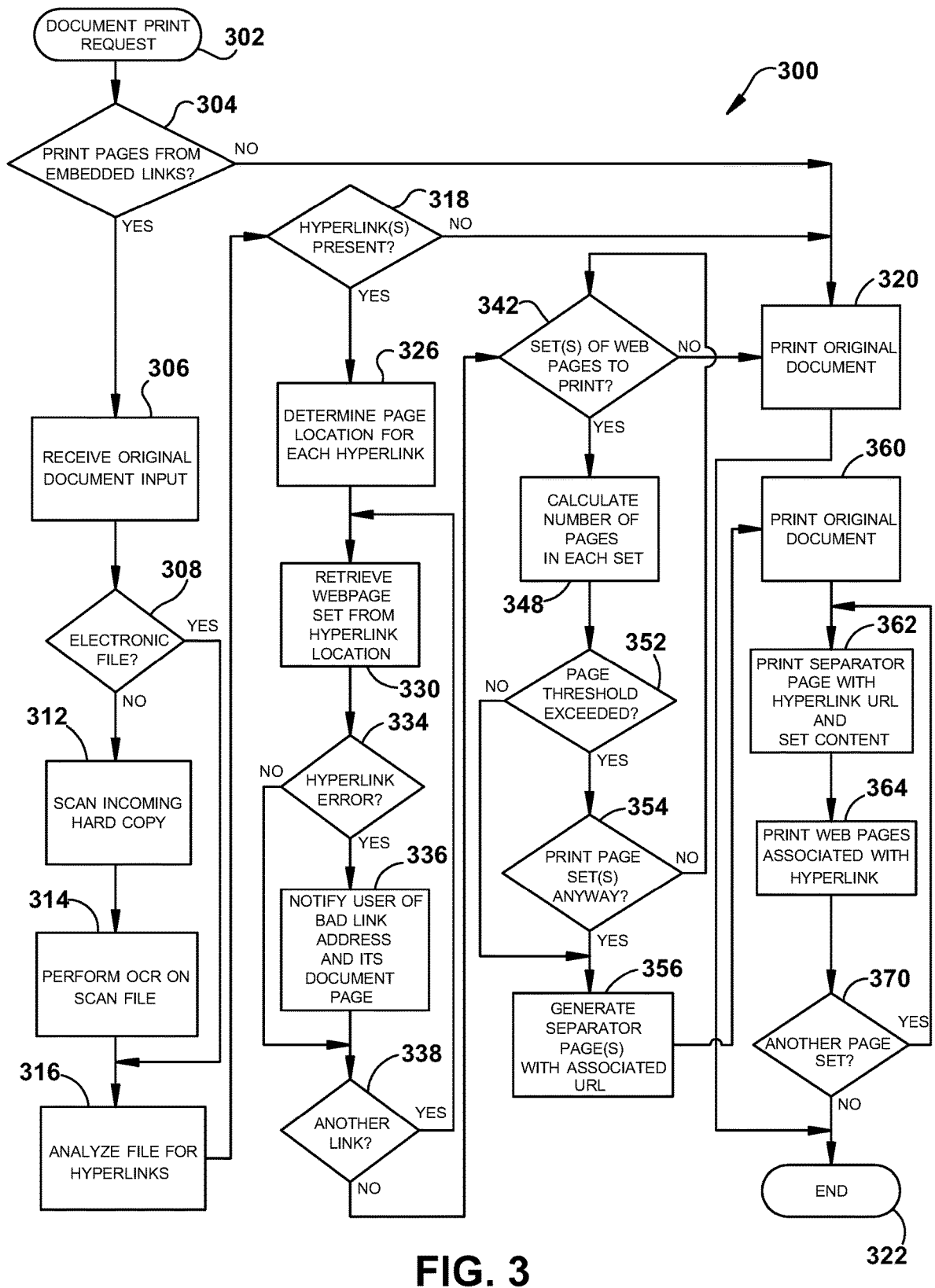
FIG. 3 is a flowchart of an example embodiment of a document rendering system for automated printing of network content identified in a document.

FIG. 3 is a flowchart 300 for an example embodiment of a document rendering system for automated printing of network content identified in a document. The process commences at block 302 with a document print request and a user request to print network content is made at block 304. An original document is received at block 306. If it is an electronic document as determined at block 308, the processing continues to block 318 to determine if addresses are embedded in the document. If it is a paper document as determined at block 308, then it is scanned at block 312 and subject to optical character recognition at block 314. If the original is already an electronic document, it is suitably subject to optical character recognition if needed at block 314. Next, the character inclusive electronic file is parsed at block 316 to determine if any network locations for content, such as hyperlinks, are present. If it is determined at block 318 that no addresses are embedded, the original document is print alone at block 320 and the process ends at block 322.

If one or more network content addresses are discovered in the parsed document at block 318, then a page location for each link is suitably determined at block 326. Content, such as a document or webpage, is retrieved from the network at block 330. If a retrieval error is determined at block 334, the user is suitably notified at block 336. If no error is present, or if a user notification has been made, presence of another link in the document is determined at block 338. The process returns to block 330 until all available content is obtained. If there are no page sets to print, such as in a case when no content could be retrieved for any embedded link, as determined by block 342, the original document is printed alone at block 320 and the process ends at block 322.

If one or more sets of content pages are available for printing, a page count for each set is suitably made at block 348 and this count is compared to a preselect threshold value at 352. This functions to prevent extremely large printouts since a document length from a link may be quite large. If the threshold is exceeded, the user is given the option to still print that content or abort it at block 354. If they choose to abort printing that set, the process returns to block 342 to determine if more sets are available. If the threshold is not exceeded or if the user chooses to print a set exceeding the threshold, then a separator page is generated at block 356, suitably showing the associated URL from which the content to follow is obtained along with a page number in the original document where the link can be located.

Once the original document, separator pages and network content has been assembled, the original document is printed at block 360, followed by printing a separator page at block 362, and content associated with that URL at block 364. If more content remains as determined by block 370, the process returns to block 362. If not, the process ends at block 322. From the forgoing, it will be understood that a user need only feed in an original document with links, such as URLs, in written text and select "Print." The resultant printout will be the original document followed by appendices of all web content identified in the text.

Figure 4:
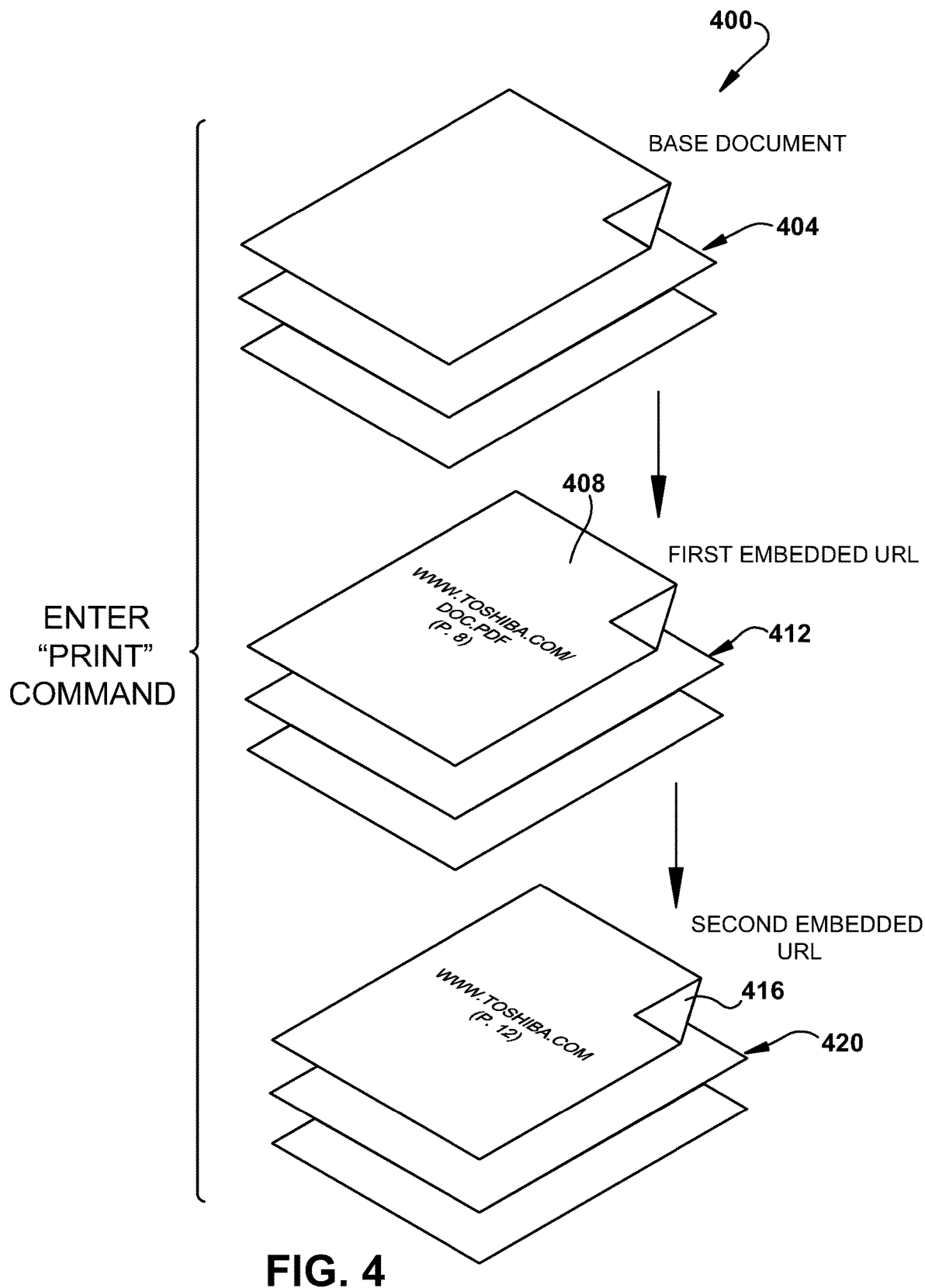
FIG. 4 is an example embodiment of a printed document.

Referring next to FIG. 4, illustrated is an example embodiment of a printed document 400 including appended web content. Entry of a single print command results in the printing of base document 404, followed by separator page 408 which precedes identified web content 412. One or more additional separator pages 416 and associated web content 420 follows.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A document processing system comprising:
   a print engine;
   a network interface configured to receive a print request for an electronic document; and
   a controller, including a processor and memory, configured to enable operation of the print engine,
      the memory configured to store the electronic document, the processor configured to automatically parse the
stored electronic document for a plurality of embedded network addresses responsive to the print request, the processor further configured to send a page request to each network address parsed from the electronic document via the network interface, the processor further configured to receive content data received via the network interface responsive to at least one successful page request, the processor further configured to determine a retrieval error corresponding to at least one unsuccessful page request;

the processor further configured to generate a user notification corresponding to each network address associated with a retrieval error;

the processor further configured to calculate a number of print pages associated with each successful page request, the processor further configured to compare a number of print pages associated with each successful page request to a page print threshold, and the controller further configured to print a tangible document via the print engine from of the electronic document and the content data associated with each successful page request including a number of print pages below the page print threshold contemporaneously.

2. The document processing system of claim 1 wherein the network address is comprised of an Internet address.

3. The document processing system of claim 2 wherein the Internet address is comprised of a uniform resource locator.

4. The document processing system of claim 3 wherein the processor is further configured to generate a separator page between a printout of the electronic document and a printout of the content data.

5. The document processing system of claim 4 wherein the processor is further configured to print the uniform resource locator on the separator page.

6. The document processing system of claim 3 further comprising a scan engine configured to generate the electronic document from a tangible document.

7. A method comprising:
storing an electronic document in a memory;
receiving a print request to print the electronic document;
automatically parsing, via a processor, a stored electronic document for a plurality of network addresses responsive to a received print request;
sending a page request to each network address parsed from the electronic document via a network interface;
receiving content data responsive to at least one successful page request via the network interface;
determining a retrieval error corresponding to at least one unsuccessful page request;
generating a user notification corresponding to each network address associated with a retrieval error;
calculating a number of print pages associated with each successful page request;
comparing a number of print pages associated with each successful page request with a print page threshold; and
printing a tangible copy corresponding to the electronic document and the content data associated with each successful page request including a number of print pages below the page print threshold contemporaneously by a print engine.

8. The method of claim 7 wherein the network address is comprised of an Internet address.

9. The method of claim 8 wherein the Internet address is comprised of a uniform resource locator.

10. The method of claim 9 further comprising generating a separator page between a printout of the electronic document and a printout of the content data.

11. The method of claim 10 further comprising printing the uniform resource locator on the separator page.

12. The method of claim 9 further comprising scanning a tangible document by a scan engine to generate the electronic document.

13. A system comprising:
a scanner configured to receive a tangible document for scanning;
the scanner further configured to generate an electronic image of a tangible document after it is received into the scanner;
a processor configured to automatically perform optical character recognition on the electronic image to generate an electronic document inclusive of character data,
the processor further configure to automatically parse the electronic document for a plurality of embedded Internet addresses,
the processor further configured to automatically connect to at least one networked device corresponding to an embedded Internet address via a network interface,
the processor further configured to determine a retrieval error corresponding to at least one unsuccessful connection via the network interface,
the processor further configured to generate a user notification associated with each network address associated with a retrieval error,
the processor further configured to receive an electronic document from each networked device with which a connection was successful,
the processor further configured to calculate a number of print pages associated with each received electronic document,
the processor further configured to compare a number of print pages associated with each received electronic document; and
a printer configured to print tangible copy comprising an image of the tangible document contemporaneously with a tangible copy comprising an image of each received electronic document including a number of print pages below the page print threshold.

14. The system of claim 13 wherein the processor is further configured to output a separator page between a printout of the tangible document and a printout of the received electronic document.

15. The system of claim 13 wherein the received electronic document is a rendering of a web page associated with the networked device.

16. The system of claim 13 wherein the received electronic document is comprised of an electronic document file resident on the networked device.

17. The system of claim 16 wherein the electronic document file is comprised of an image file.

18. The system of claim 16 wherein the electronic document is comprised of an editable electronic file.

19. The system of claim 13 wherein the processor is further configured to determine whether a user chooses to print pages beyond the threshold.

20. They system of claim 19 wherein the printer is further configured to print pages in excess of the threshold in accordance in accordance with a determined choice from the user.

* * * * *